US008036166B2

(12) United States Patent
Tiirola et al.

(10) Patent No.: US 8,036,166 B2
(45) Date of Patent: Oct. 11, 2011

(54) SIGNALING OF IMPLICIT ACK/NACK RESOURCES

(75) Inventors: Esa Tiirola, Kempele (FI); Kari Pajukoski, Oulu (FI); Esa Malkamäki, Espoo (FI)

(73) Assignee: Nokia Corporation, Espoo (FI)

( * ) Notice: Subject to any disclaimer, the term of this patent is extended or adjusted under 35 U.S.C. 154(b) by 742 days.

(21) Appl. No.: 11/820,091

(22) Filed: Jun. 18, 2007

(65) Prior Publication Data
US 2008/0310540 A1 Dec. 18, 2008

(51) Int. Cl.
*H04W 4/00* (2009.01)
(52) U.S. Cl. ........ 370/329; 370/335; 370/432; 370/436; 370/441; 370/474; 375/260; 714/749
(58) Field of Classification Search .................. 370/329, 370/330, 341, 342–345, 350, 436–437
See application file for complete search history.

(56) References Cited

U.S. PATENT DOCUMENTS

| 6,724,813 | B1* | 4/2004 | Jamal et al. | 375/219 |
|---|---|---|---|---|
| 7,085,228 | B2 | 8/2006 | Zaki et al. | 370/229 |
| 7,212,507 | B2 | 5/2007 | Wang et al | 370/329 |
| 7,248,567 | B2 | 7/2007 | Desgagne et al. | 370/277 |
| 7,328,025 | B2 | 2/2008 | Jechoux | 455/452.1 |
| 2004/0264393 | A1 | 12/2004 | Desgagne et al. | 370/294 |
| 2005/0153702 | A1 | 7/2005 | Cuffaro et al. | 455/452.1 |
| 2007/0115816 | A1 | 5/2007 | Sinivaara | 370/230 |
| 2007/0230600 | A1* | 10/2007 | Bertrand et al. | 375/260 |
| 2007/0258540 | A1* | 11/2007 | Ratasuk et al. | 375/267 |
| 2008/0075184 | A1 | 3/2008 | Muharemovic et al. | 375/260 |
| 2008/0075195 | A1* | 3/2008 | Pajukoski et al. | 375/298 |
| 2008/0080422 | A1* | 4/2008 | Frederiksen et al. | 370/329 |
| 2008/0080423 | A1 | 4/2008 | Kolding et al. | 370/329 |
| 2008/0101305 | A1 | 5/2008 | Cave et al. | 370/336 |
| 2008/0159250 | A1* | 7/2008 | Kowalski | 370/344 |
| 2008/0192674 | A1* | 8/2008 | Wang et al. | 370/315 |
| 2008/0205348 | A1* | 8/2008 | Malladi | 370/335 |
| 2008/0225791 | A1* | 9/2008 | Pi et al. | 370/330 |
| 2008/0225822 | A1* | 9/2008 | Zhang et al. | 370/343 |
| 2008/0227481 | A1* | 9/2008 | Naguib et al. | 455/550.1 |
| 2008/0233964 | A1* | 9/2008 | McCoy et al. | 455/450 |

(Continued)

FOREIGN PATENT DOCUMENTS
WO WO-00/22866 4/2000
(Continued)

OTHER PUBLICATIONS

3GPP TSG RAN WG1 Meeting #48bis, R1-071649, "CDMA-Based Multiplexing Method for Multiple ACK/NACK and CQI in E-UTRA Uplink", St. Julians, Malta, NTT DoCoMo et al., Mar. 26-30, 2007, 6 pgs.

(Continued)

*Primary Examiner* — Kent Chang
*Assistant Examiner* — Magdi Elhag
(74) *Attorney, Agent, or Firm* — Harrington & Smith

(57) ABSTRACT

A method includes, in response to receiving implicit signaling of the radio resource, and in response to a plurality of wireless communication system cell-specific static and semi-static input parameters, determining a plurality of output parameters and allocating radio resources using the determined output parameters. Also disclosed are computer readable storage mediums for storing programs that operate in accordance with the methods, as well as various devices that operate in accordance with the methods and that include the computer readable storage mediums.

49 Claims, 15 Drawing Sheets

U.S. PATENT DOCUMENTS

| | | | |
|---|---|---|---|
| 2008/0273513 A1* | 11/2008 | Montojo et al. | 370/342 |
| 2008/0273610 A1* | 11/2008 | Malladi et al. | 375/260 |
| 2008/0298477 A1* | 12/2008 | Classon | 375/260 |
| 2008/0298488 A1* | 12/2008 | Shen et al. | 375/260 |
| 2009/0022098 A1* | 1/2009 | Novak et al. | 370/329 |
| 2009/0116434 A1* | 5/2009 | Lohr et al. | 370/329 |
| 2010/0027450 A1* | 2/2010 | Montojo et al. | 370/311 |
| 2010/0027495 A1* | 2/2010 | Che et al. | 370/329 |
| 2010/0238870 A1* | 9/2010 | Mitra et al. | 370/329 |

FOREIGN PATENT DOCUMENTS

| | | |
|---|---|---|
| WO | WO-2007/089797 A2 | 8/2007 |
| WO | WO-2007/137201 A2 | 11/2007 |

OTHER PUBLICATIONS

3GPP TSG RAM WG1 Meeting #48bis, R1-071650, "Implicit Resource Allocation of ACK/NACK Signal in E-UTRA Uplink", St. Julians, NTT DoCoMo et al., Malta, Mar. 26-30, 2007, 3 pgs.

3GPP TSG RAN WG1 #48bis, R1-071662, "Uplink Scheduling Request for LTE", St. Julians, Nokia Siemens, Malta, Mar. 26-30, 2007, 4 pgs.

3GPP TSG RAN WG1 Meeting #48bis, R1-071676, "Data-non-associated Control Signal Transmission without UL Data", St. Julians, Nokia Siemens, Malta, Mar. 26-30, 2007, 6 pgs.

3GPP TSG RAN WG1 Meeting #47bis, Sorrento, Italy, Jan. 15-19, 2007, "CDM based Control Signal multiplexing w/ and w/o additional RS", Nokia R1-070395, 5 pgs.

3GPP TSG RAN WG1 Meeting #49, Orlando Florida-USA, Jun. 25-29, 2007, Draft Report of 3GPP TSG RAN WG1 Meeting #49 v0.3.0 (Kobe, Japan, May 7-11, 2007), Section 7.13.2), 54 pgs.

3GPP TSG RAN WG1 Meeting #47bis, Sorento, Italy, Jan. 15-19, 2007, "ACK/NACK coverage in the absence of UL data", Nokia, R1-070393, 5 pgs.

* cited by examiner

FIG.3

PILOT

| CYCLIC SHIFT | BLOCK-LEVEL CODE | | |
|---|---|---|---|
| | 0 | 1 | 2 |
| 0 | 0 | 23 | 34 |
| 1 | 1 | 12 | 35 |
| 2 | 2 | 13 | 24 |
| 3 | 3 | 14 | 25 |
| 4 | 4 | 15 | 26 |
| 5 | 5 | 16 | 27 |
| 6 | 6 | 17 | 28 |
| 7 | 7 | 18 | 29 |
| 8 | 8 | 19 | 30 |
| 9 | 9 | 20 | 31 |
| 10 | 10 | 21 | 32 |
| 11 | 11 | 22 | 33 |

DATA

| CYCLIC SHIFT | BLOCK-LEVEL CODE | | | |
|---|---|---|---|---|
| | 0 | 1 | 2 | 3 |
| 0 | 0 | 23 | 34 | 3 |
| 1 | 1 | 12 | 35 | 45 |
| 2 | 2 | 13 | 24 | 46 |
| 3 | 3 | 14 | 25 | 47 |
| 4 | 4 | 15 | 26 | 36 |
| 5 | 5 | 16 | 27 | 37 |
| 6 | 6 | 17 | 28 | 38 |
| 7 | 7 | 18 | 29 | 39 |
| 8 | 8 | 19 | 30 | 40 |
| 9 | 9 | 20 | 31 | 41 |
| 10 | 10 | 21 | 32 | 42 |
| 11 | 11 | 22 | 33 | 43 |
| | | | | 44 |

FIG.4

EXAMPLE:
REUSE=1/3
12 UEs/CELL

3rd IMPLICIT RESOURCE

1/3 REUSE BTW SECTORS OF THE SAME NODE B

1/3 REUSE BTW SECTORS OF DIFFERENT NODE B's 10 dB ATTENUATION BETWEEN ADJACENT CYCLIC SHIFTS HAVE BEEN ASSUMED

| FREQUENCY CYCLIC SHIFT | CYCLIC SHIFT OF BLOCK CODE | | | |
|---|---|---|---|---|
| | 0 | 1 | 2 | 3 |
| 0 | 0 | 23 | 34 | 45 |
| 1 | 1 | 12 | 35 | 46 |
| 2 | 2 | 13 | 24 | 47 |
| 3 | 3 | 14 | 25 | 36 |
| 4 | 4 | 15 | 26 | 37 |
| 5 | 5 | 16 | 27 | 38 |
| 6 | 6 | 17 | 28 | 39 |
| 7 | 7 | 18 | 29 | 40 |
| 8 | 8 | 19 | 30 | 41 |
| 9 | 9 | 20 | 31 | 42 |
| 10 | 10 | 21 | 32 | 43 |
| 11 | 11 | 22 | 33 | 44 |

| FREQUENCY CYCLIC SHIFT | CYCLIC SHIFT OF BLOCK CODE | | | | |
|---|---|---|---|---|---|
| | 0 | 1 | 2 | 3 | 4 |
| 0 | 0 | 23 | 34 | 45 | 56 |
| 1 | 1 | 12 | 35 | 46 | 57 |
| 2 | 2 | 13 | 24 | 47 | 58 |
| 3 | 3 | 14 | 25 | 36 | 59 |
| 4 | 4 | 15 | 26 | 37 | 48 |
| 5 | 5 | 16 | 27 | 38 | 49 |
| 6 | 6 | 17 | 28 | 39 | 50 |
| 7 | 7 | 18 | 29 | 40 | 51 |
| 8 | 8 | 19 | 30 | 41 | 52 |
| 9 | 9 | 20 | 31 | 42 | 53 |
| 10 | 10 | 21 | 32 | 43 | 54 |
| 11 | 11 | 22 | 33 | 44 | 55 |

FIG.10B

| FIG.10A |
|---|
| FIG.10B |

| FREQUENCY CYCLIC SHIFT | CYCLIC SHIFT OF BLOCK CODE | | | |
|---|---|---|---|---|
| | 0 | 1 | 2 | 3 |
| 0 | 0 | 23 | 34 | 45 |
| 1 | 1 | 12 | 35 | 46 |
| 2 | 2 | 13 | 24 | 47 |
| 3 | 3 | 14 | 25 | 36 |
| 4 | 4 | 15 | 26 | 37 |
| 5 | 5 | 16 | 27 | 38 |
| 6 | 6 | 17 | 28 | 39 |
| 7 | 7 | 18 | 29 | 40 |
| 8 | 8 | 19 | 30 | 41 |
| 9 | 9 | 20 | 31 | 42 |
| 10 | 10 | 21 | 32 | 43 |
| 11 | 11 | 22 | 33 | 44 |

FIG.12

SIGNALING OF IMPLICIT ACK/NACK RESOURCES

TECHNICAL FIELD

The exemplary and non-limiting embodiments of this invention relate generally to wireless communication systems, methods, devices and computer program products and, more specifically, relate to techniques for transmitting information between a user device and a wireless network device for making a resource allocation.

BACKGROUND

Certain abbreviations that may be found in the description and/or in the Figures are herewith defined as follows:

| | |
|---|---|
| 3GPP | Third Generation Partnership Project |
| CAZAC | constant-amplitude zero auto-correlation |
| CDM | code division multiplexing |
| CDMA | code division multiple access |
| CM | cubic metric |
| CP | cyclic prefix |
| CQI | channel quality indicator |
| DFT | discrete Fourier transform |
| E-UTRAN | evolved UTRAN |
| FDM | frequency division multiplexing |
| FDMA | frequency division multiple access |
| FFT | fast Fourier transform |
| IFFT | inverse FFT |
| LB | long block |
| LTE | long term evolution |
| Node B | Base Station |
| eNode B | EUTRAN Node B (eNB) |
| OFDM | orthogonal frequency domain multiplex |
| PAR | peak to average ratio |
| PRB | physical resource block |
| PUCCH | physical uplink control channel |
| QPSK | quadrature phase shift keying |
| RRC | radio resource control |
| RS | reference signal |
| RU | resource unit |
| SC | subcarrier |
| SC-FDMA | single carrier, frequency division multiple access |
| SF | spreading factor |
| SNR | signal to noise ratio |
| TTI | transmission time interval |
| UE | user equipment |
| UL | uplink |
| UTRAN | universal terrestrial radio access network |
| DFT-S-OFDM | discrete Fourier transform spread OFDM (SC-FDMA based on frequency domain processing) |
| WCDMA | wideband code division multiple access |

A proposed communication system known as evolved UTRAN (E-UTRAN, also referred to as UTRAN-LTE) is currently under discussion within the 3GPP. The working assumption is that the DL access technique will be OFDMA, and the UL technique will be SC-FDMA.

Reference can be made to 3GPP TR 36.211, V1.0.0 (2007-03), 3rd Generation Partnership Project; Technical Specification Group Radio Access Network; Physical Channels and Modulation (Release 8), for a description in Section 6 of the UL physical channels.

Reference can also be made to 3GPP TR 25.814, V7.1.0 (2006-09), 3rd Generation Partnership Project; Technical Specification Group Radio Access Network; Physical layer aspects for evolved Universal Terrestrial Radio Access (UTRA) (Release 7), such as generally in section 9.1, for a description of the SC-FDMA UL of E-UTRA.

FIG. 1A reproduces FIG. 12 of 3GPP TS 36.211 and shows the UL slot format for a generic frame structure.

As is described in Section 9.1 of 3GPP TR 25.814, the basic uplink transmission scheme is single-carrier transmission (SC-FDMA) with cyclic prefix to achieve uplink inter-user orthogonality and to enable efficient frequency-domain equalization at the receiver side. Frequency-domain generation of the signal, sometimes known as DFT-spread OFDM (DFT S-OFDM), is assumed.

FIG. 1B shows the generation of pilot samples. An extended or truncated Zadoff-Chu symbol sequence is applied to an IFFT block via a sub-carrier mapping block. The sub-carrier mapping block determines which part of the spectrum is used for transmission by inserting a suitable number of zeros at the upper and/or lower end. A CP is inserted into the output of the IFFT block.

In the PUCCH sub-frame structure for the UL control signaling seven SC-FDMA symbols (also referred to herein as "LBs" for convenience) are currently defined per slot. A sub-frame consists of two slots. Part of the LBs are used for reference signals (pilot long blocks) for coherent demodulation. The remaining LBs are used for control and/or data transmission.

It is pointed out that there are different slot formats that are applicable for the exemplary embodiments of this invention that are described below. Reference in this regard may be made to Table 1 "Resource block parameters" on page 10 of 3GPP TR 36.211, V1.0.0 (2007-03).

The current working assumption is that for the PUCCH the multiplexing within a PRB is performed using CDM and (localized) FDM is used for different resource blocks. In the PUCCH the bandwidth of one control and pilot signal always corresponds to one PRB=12 SCs.

It should be noted that it has yet to be determined whether to support 18 SCs on the PUCCH. However, for the purposes of describing the exemplary embodiments of this invention below the exact number of SCs does not matter (e.g., whether there are 12 or 18 SCs that are supported).

Two types of CDM multiplexing are used both for data and pilot LBs. Multiplexing based on the usage of cyclic shifts provides nearly complete orthogonality between different cyclic shifts, if the length of cyclic shift is larger than the delay spread of radio channel. For example, with an assumption of a 5 microsecond delay spread in the radio channel, up to 12 orthogonal cyclic shifts within one LB can be achieved. Sequence sets for different cells are obtained by changing the sequence index.

Another type of CDM multiplexing may be applied between LBs based on orthogonal covering sequences, e.g., Walsh or DFT spreading. This orthogonal covering may be used separately for those LBs corresponding to the RS and those LBs corresponding to the data signal. The CQI is typically transmitted without orthogonal covering.

Of particular interest to the exemplary embodiments of this invention is control channel signaling and, in particular, the use of the PUCCH.

More specifically, the exemplary embodiments of this invention pertain to ACK/NACK signaling. The ACK/NACK signaling format has been determined and is shown in FIG. 2 (originally presented in 3GPP TSG RAN WG1 Meeting #47bis, Sorrento, Italy, Jan. 15-19, 2007, "CDM based Control Signal multiplexing w/ and w/o additional RS", Nokia, R1-070395.

In this approach the ACK/NACK is transmitted by means of a modulated CAZAC sequence, and the ACK/NACK signals of different UEs can be orthogonally multiplexed within the pilot/data blocks using different cyclic shifts of the same base CAZAC sequence. The length of the CAZAC sequence is equal to 12 symbols. Also, coherent transmission with three reference signal (RS) blocks and four data blocks (ACK/NACK) is applied. In addition, block level spreading with SF=¾ is applied to the RS/data blocks.

Different ACK/NACK UEs are multiplexed by means of CDM. As can be seen in FIG. 3, there are in total 12×3=36 code resources available for reference signals and 12×4=48 resources for data signals. Due to the intra-cell orthogonality issue, only part of the code resources can be used in practice (e.g., one half or one third).

In this case these resources are not allocated explicitly because of the fact that the fixed size resource is always needed in certain situations. Instead, implicit resource allocation is used. It has been determined at RAN1 meeting (#49, Kobe) that for non-persistent scheduling the ACK/NAK resource is linked to the index of the control channel used for (DL) scheduling (see 3GPP TSG RAN WG1 Meeting #49, Orlando Fla.-USA, 25-29 Jun. 2007, "Draft Report of 3GPP TSG RAN WG1 Meeting #49 v0.3.0 (Kobe, Japan, 7-11 May 2007), Section 7.13.2).

The actual need for implicit ACK/NACK resources depends on the number of scheduled UEs in the DL (e.g., bandwidth and scheduling strategy). In a practical sense the ACK/NACK capacity is limited by the inter-cell interference. In general, about 10-12 ACK/NACK UEs/RU/cell can be supported (at least in the DL SIMO case). Reference in this regard may be made to 3GPP TSG RAN WG1 Meeting #47bis, Sorrento, Italy, Jan. 15-19, 2007, "ACK/NACK coverage in the absence of UL data", Nokia, R1-070393.

It has been determined in 3GPP that implicit ACK/NACK resources are configured by means of RRC signaling. However, it can be seen that a number of parameters are needed to characterize one implicit ACK/NACK resource. An implicit ACK/NACK resource here means an ACK/NACK resource that is allocated via implicit signaling, i.e., there is no explicit signaling that tells to the UE which ACK/NACK resource to use for acknowledging a DL transmission. Instead, the ACK/NACK resource is tied to the DL control channel index and is thus signaled implicitly (e.g., by the control channel index). First, static parameters are needed, such as the frequency allocation of the ACK/NACK resource, i.e., the RU for the 1st slot and for the 2nd slot (see FIG. 1). Also needed is the spreading factor of RS blocks (e.g., 3), with two alternatives in the FDD mode (depending on the CP length). Also needed is the spreading factor of data blocks (e.g., 4), with two alternatives in the FDD mode (depending on the CP length). Also needed is the length of the CAZAC sequence (12 frequency bins), with 18 bins being a possible candidate. The static parameters are typically defined in the standard specification.

Second, semi-static parameters are needed, such as the base sequence of the frequency domain CAZAC code (typically separately for the pilot and the data), the base sequence of the block level code (typically separately for the pilot and the data), the cyclic shift allocation for the frequency domain CAZAC code (typically separately for the pilot and the data), the cyclic shift allocation for block level code (typically separately for the pilot and the data), information concerning cyclic shift hopping (typically separately for the pilot and the data), as well as information concerning possible CAZAC sequence hopping (it is for future study whether this feature is supported). The semi-static parameters are typically signaled using higher layer signaling (e.g., RRC signaling) to each UE, or they may be broadcast to the entire cell via a broadcast channel.

It can be noted that most of these parameters are cell-specific, including all of the static parameters, the base sequence indices (both in the frequency and block domains) and the shift/sequence hopping related parameters.

The largest burden is related to the signaling of the cyclic shift resources, which are resource specific. Note that 12 bits are needed to characterize cyclic shifts of one implicit ACK/NACK resource, where six bits are needed to characterize the ACK/NACK RS resource (12*3 available code channels) and an additional six bits are needed to characterize the ACK/NACK data resource (12*4 code channels).

It has been assumed thus far that all of the cyclic shifts of all available implicit ACK/NACK resources are explicitly signaled by means of RRC signaling. This corresponds to a signaling burden with 12, 18 and 36 implicit ACK/NACK resources (there are thus 12, 18 or 36 ACK/NACKs possible to send per TTI) that is equal to 144 bits, 216 bits and 432, respectively. As can be appreciated, this amount of signaling load can be disadvantageous.

SUMMARY

The foregoing and other problems are overcome by the use of the exemplary embodiments of this invention.

In one aspect thereof the exemplary embodiments of this invention provide a method that comprises, in response to receiving implicit signaling of the radio resource, and in response to a plurality of wireless communication system cell-specific static and semi-static input parameters, determining a plurality of output parameters; and locating radio resources using the determined output parameters.

In another aspect thereof the exemplary embodiments of this invention provide a computer readable medium that is encoded with a computer program, the execution of which by a data processor results in operations that comprise in response to receiving implicit signaling of the radio resource, and in response to a plurality of wireless communication system cell-specific static and semi-static input parameters, determining a plurality of output parameters; and allocating radio resources using the determined output parameters.

In another aspect thereof the exemplary embodiments of this invention provide an apparatus having a receiver configured to receive implicit signaling of a radio resource; and a resource allocation unit configured to respond to the received implicit signaling, and a plurality of wireless communication system cell-specific static and semi-static input parameters, to determine a plurality of output parameters to use in allocating uplink radio resources.

In another aspect thereof the exemplary embodiments of this invention provide an apparatus that includes means for receiving implicit signaling of a radio resource; and means for determining a plurality of output parameters to use in allocating uplink radio resources, said determining means using the received implicit signaling and a plurality of wireless communication system cell-specific static and semi-static input parameters.

In another aspect thereof the exemplary embodiments of this invention provide a user equipment that includes a receiver configured to receive implicit signaling of a radio resource and a resource allocation unit configured to respond to the received implicit signaling, and a plurality of wireless communication system cell-specific static and semi-static input parameters, to determine a plurality of output parameters to use in allocating uplink radio resources. In the user equipment the plurality of output parameters comprise a cyclic shift of a block spreading code and a cyclic shift of a frequency domain code; and the plurality of wireless communication system cell-specific semi-static input parameters are received by implicit signaling. The plurality of wireless communication system cell-specific semi-static input parameters comprise res__1st: a resource number of a first implicit resource; and shift_diff: a cyclic shift difference between two implicit resources. A further wireless communication system input parameter comprises impl_res: a resource number. The plurality of cell specific static input parameters comprise num_t_shift: a number of cyclic shifts of a block spreading code; and num_f shift: a number of cyclic shifts of a frequency domain code. The output parameters comprise a cyclic shift of the block spreading code, expressed as shift_t, for a given value of impl_res, and a cyclic shift of the frequency domain code, expressed as shift_μl for the given value of impl_res. The output parameters shift_t and shift_f are determined by the resource allocation unit by operations that comprise:

```
shift_t = mod ( floor(i_temp / num_f_shift), num_t_shift); and
shift_f = mod ( i_temp + shift_t + mod ( floor( impl_res ×
   shift_diff / num_res ), shift_diff), num_f_shift );
where
num_res = num_t_shift × num_f_shift;
i_temp = res_1st + (impl_res × shift_diff); and
where
floor is a function that rounds elements of nearest integers towards
   minus infinity, and mod is the modulus after a division operation.
```

In another aspect thereof the exemplary embodiments of this invention provide a wireless network device that comprises a resource unit configured to specify information for a user equipment, the information comprising a plurality of cell-specific static and semi-static input parameters. The semi-static input parameters comprise: res__1st: a resource number of a first implicit resource; and shift_diff: a cyclic shift difference between two implicit resources. The information further comprises a value for impl_res: a resource number. Also included is a transmitter to transmit the information to the user equipment for use in allocating resources to be used for sending at least one of ACK/NACK and SR signaling to the wireless network device.

BRIEF DESCRIPTION OF THE DRAWINGS

In the attached Drawing Figures:

FIG. 3 shows examples of cyclic shifts and block codes for pilot and data transmissions.

FIG. 4 presents an example of a reuse=⅓ with 12 UEs per cell in three cells.

FIG. 8 presents an example of resource numbering for the res__1st signaled parameter of FIG. 7.

FIG. 9 is an example of resource allocation, where the block A shows a numbering principle and block B shows an example of a shift allocation for the indicated cell-specific parameters.

FIGS. 10 and 11 present further examples of resource allocation (FIG. 11 shows the case of a code reuse of ⅓, and 12 implicit resources per cell).

FIG. 12 shows an example of implicit resources with a limited code space.

DETAILED DESCRIPTION

The exemplary embodiments of this invention provide in at least one aspect thereof enhancements to the UL portion of LTE, and provide code resource allocation for DL ACK/NACK signals transmitted in the UL PUCCH. These resources are utilized by UEs having only ACK/NACK signals to be transmitted, and not UL data or periodic CQI signaling.

The exemplary embodiments of this invention provide in at least one further aspect thereof for the allocation and signaling of implicit ACK/NACK resources using an efficient signaling scheme which can be used to map the implicit control channel indices into the physical code resources of the PUCCH.

Figure 6:
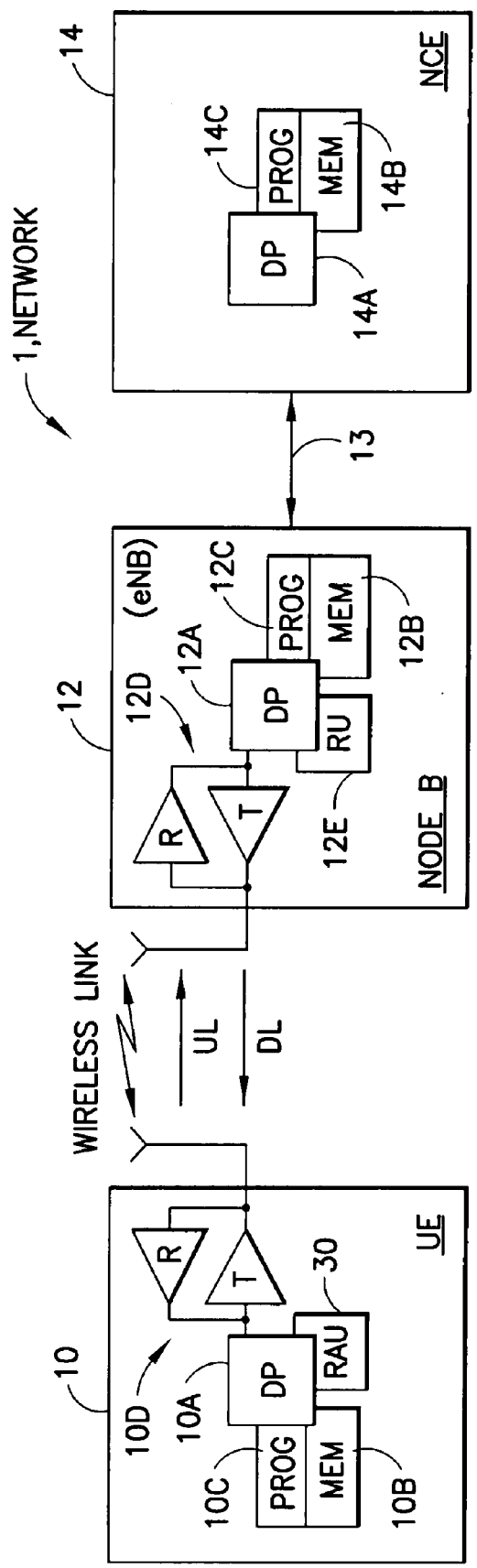
FIG. 6 shows a simplified block diagram of various electronic devices that are suitable for use in practicing the exemplary embodiments of this invention.

Before further discussing the exemplary embodiments of this invention reference is made to FIG. 6 for illustrating a simplified block diagram of various electronic devices that are suitable for use in practicing the exemplary embodiments of this invention. In FIG. 6 a wireless network 1 is adapted for communication with a UE 10 via at least one Node B (base station) 12 (also referred to herein as an eNode B 12). The network 1 may include a network control element (NCE) 14 coupled to the eNode B 12 via a data path 13. The UE 10 includes a data processor (DP) 10A, a memory (MEM) 10B that stores a program (PROG) 10C, and a suitable radio frequency (RF) transceiver 10D having a transmitter (T) and a receiver (R) for bidirectional wireless communications with the eNode B 12, which also includes a DP 12A, a MEM 12B that stores a PROG 12C, and a suitable RF transceiver 12D having a transmitter (T) and a receiver (R). The eNode B 12 is typically coupled via the data path 13 to the network control element 14 that also includes at least one DP 14A and a MEM 14B storing an associated PROG 14C. At least one of the PROGs 10C and 12C is assumed to include program instructions that, when executed by the associated DP, enable the electronic device to operate in accordance with the exemplary embodiments of this invention, as will be discussed below in greater detail.

The UE 10 includes a resource allocation unit (RAU) 30, shown in further detail in FIGS. 7 and 13, that operates in accordance with the exemplary embodiments of this invention (as described in detail below).

In a typical implementation there will be a plurality of UEs 10 that are present and that require the use of UL signaling.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The exemplary embodiments of this invention may be implemented by computer software executable by the DP 10A of the UE 10 and the DP 12A of the eNode B 12, or by hardware, or by a combination of software (and firmware) and hardware.

The MEMs 10B, 12B and 14B may be of any type suitable to the local technical environment and may be implemented using any suitable data storage technology, such as semiconductor-based memory devices, flash memory, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

Before discussing in greater detail the exemplary embodiments of this invention, reference can be made to the following points regarding ACK/NACK signaling schemes.

First, certain principles should be applied when allocating different (implicit) CDM resources between different UEs 10. One may note that different code channels interfere with each other in a practical system. For example, the orthogonality between different cyclic shifts of a frequency domain CAZAC code is limited by the delay spread of the radio channel, and further the orthogonality between different cyclic shifts of a block level CAZAC/Hadamard code is limited by the Doppler spread of the radio channel.

It can be shown that adjacent cyclic shifts in both the frequency and time domain have the worst orthogonality properties. Due to the intra/inter-cell orthogonality issues, only part of the code resources can be used in practice. The question that arises then is how to best capitalize on the unused code space?

With regard to an improved intra-cell orthogonality, this can be maximized by allocating the code channels according to the propagation conditions (delay/Doppler spread) and according to the number of implicit signaled ACK/NACK resources.

Figure 1A:
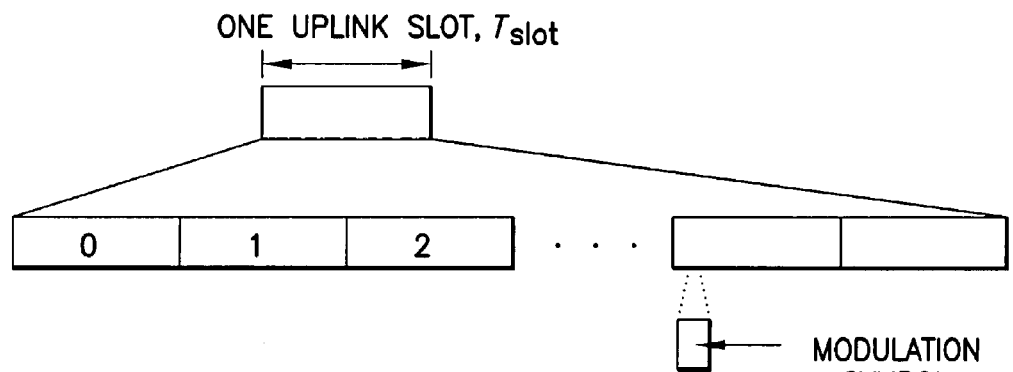
FIG. 1A reproduces FIG. 12 of 3GPP TS 36.211 and shows the UL slot format for a generic frame structure.
Figure 1B:
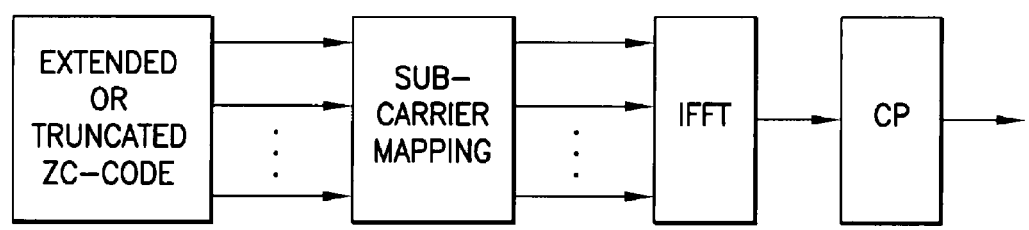
FIG. 1B is a block diagram that illustrates the generation of pilot samples for the 3GPP LTE SC-FDMA UL.
Figure 2:
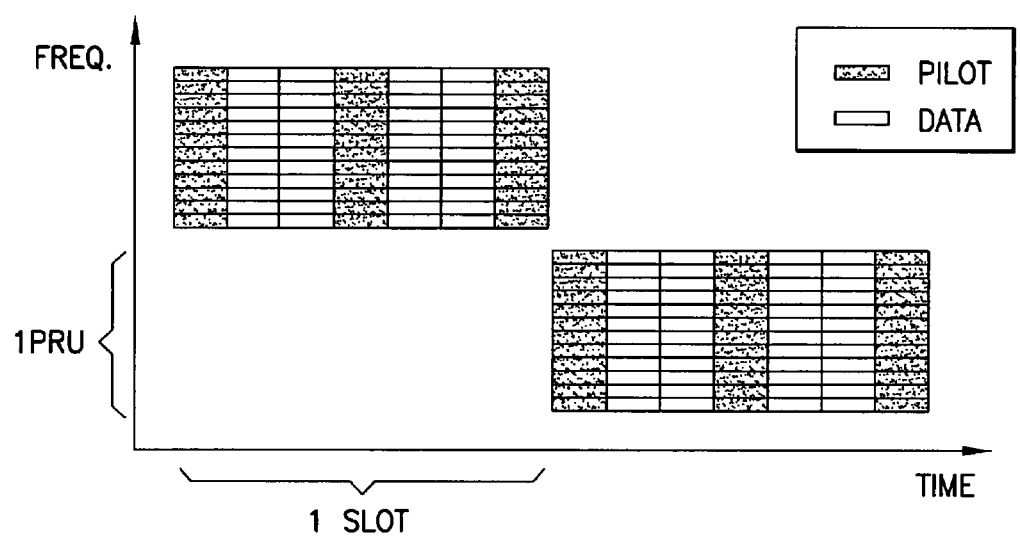
FIG. 2 shows the transmission format of ACK/NACK signaling transmitted on the PUCCH.
Figure 4:
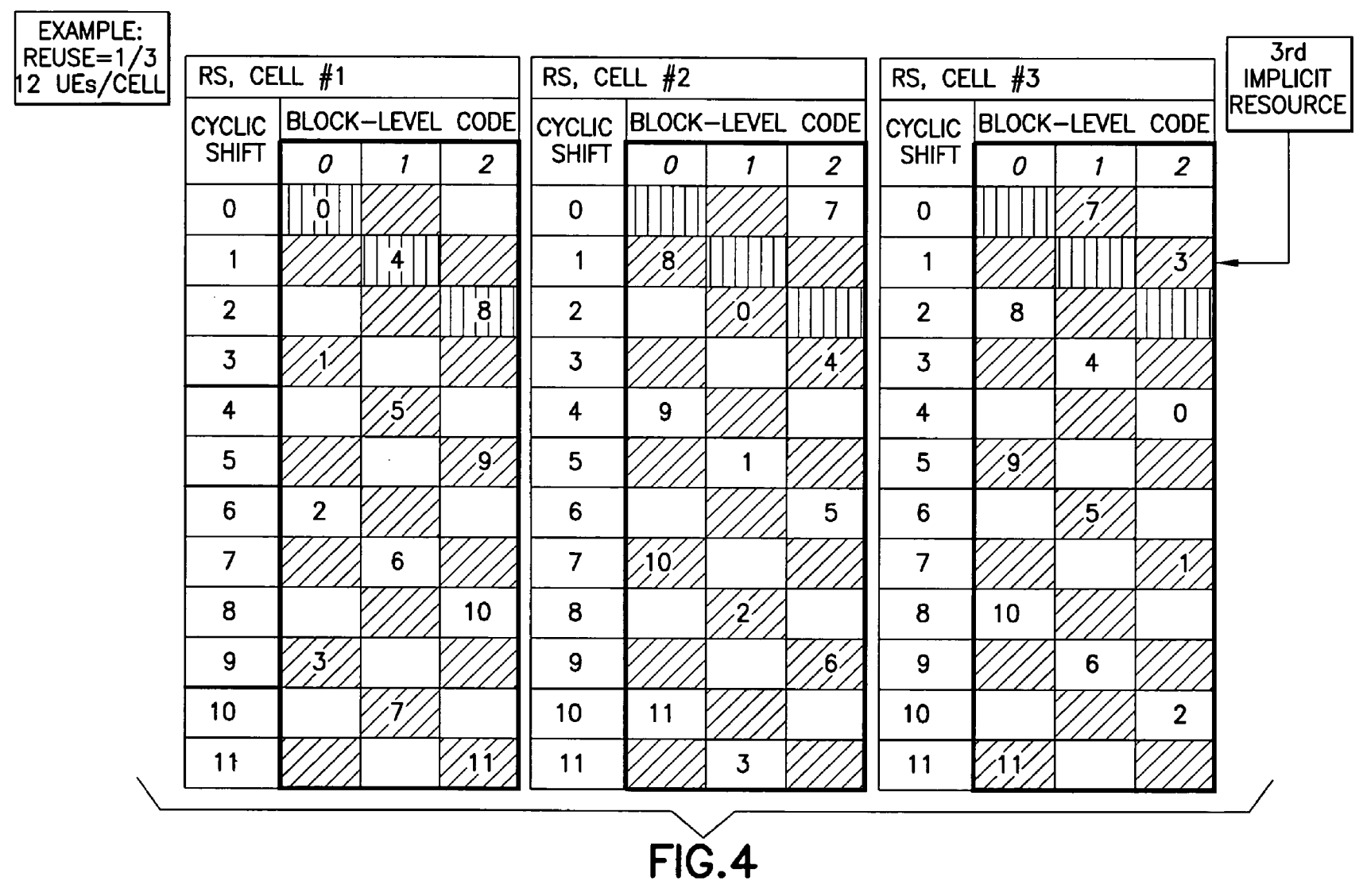
Figure 5A:
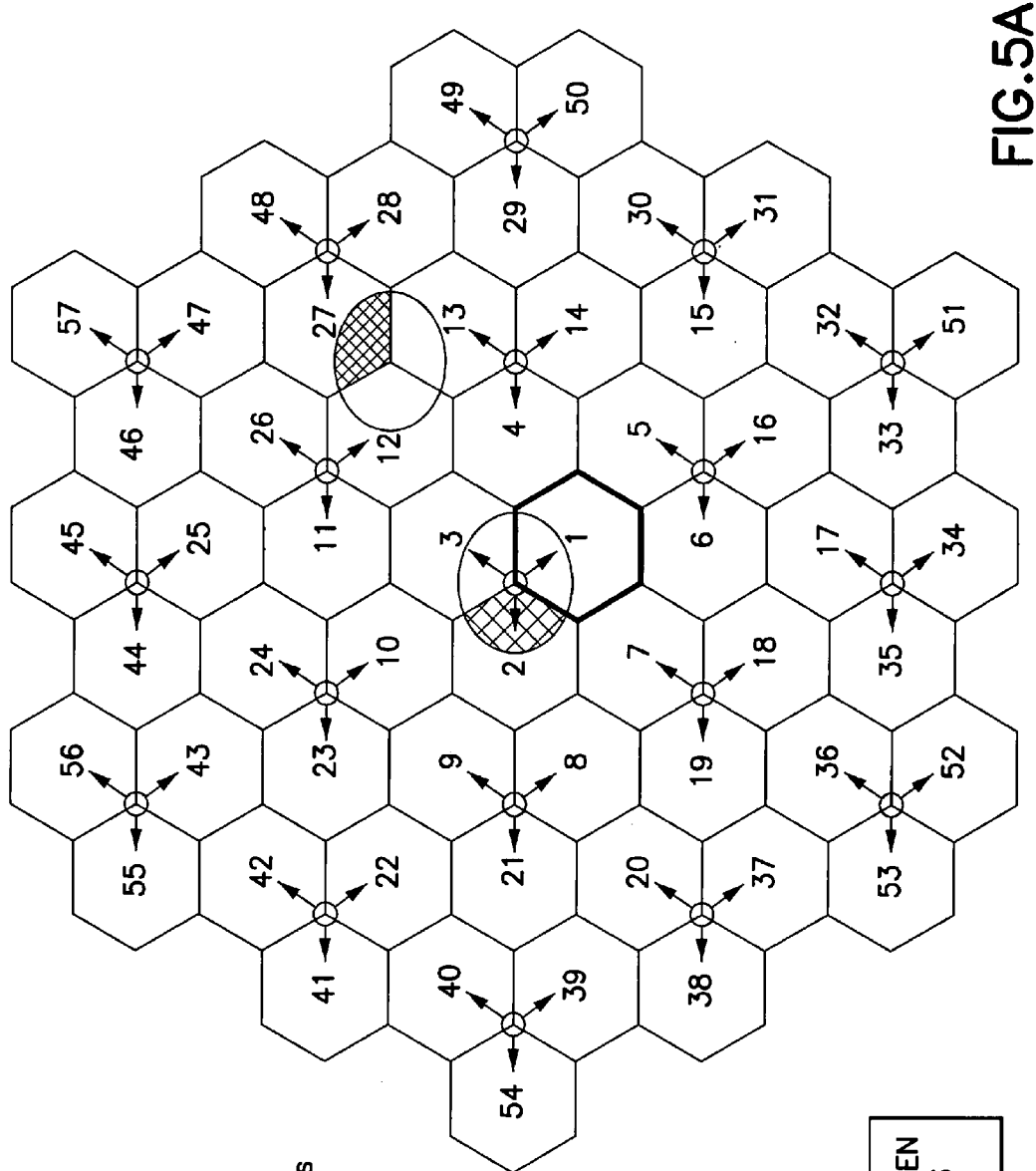
FIGS. 5A, 5B and 5C illustrate the system level gain achieved by coordinated code allocation.
Figure 5A:
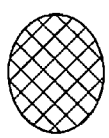
Figure 5A:
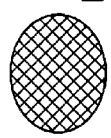
Figure 5B:
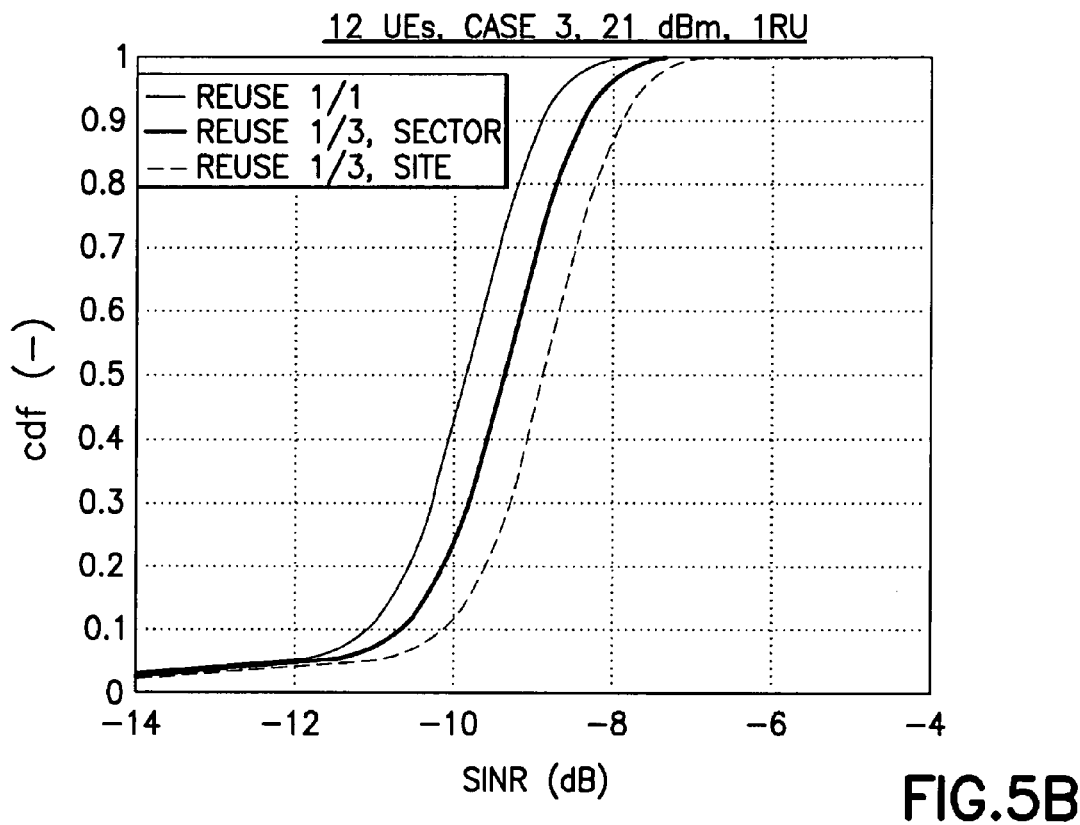
Figure 5C:
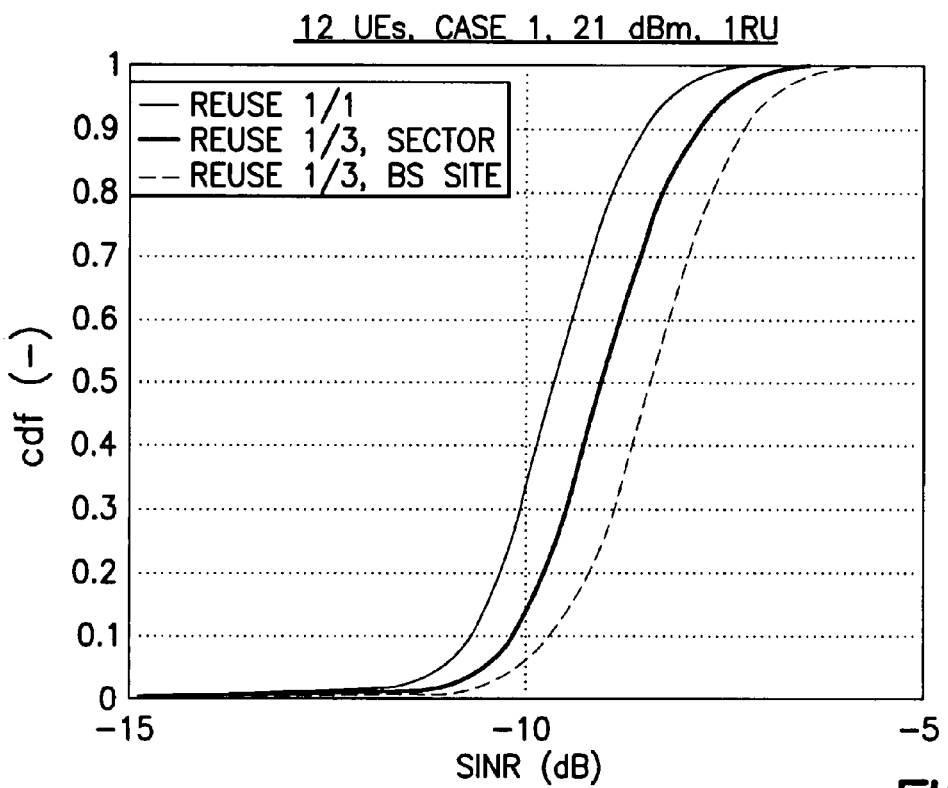

With regard to improved inter-cell orthogonality, this can be achieved by dividing the available code resource between the adjacent cells. The orthogonality can also be improved when the same base sequences (both frequency and time domain) are utilized in a coordinated way between adjacent cells. The reuse-pattern is also a consideration. Reference in this regard can be made to the examples presented in FIG. 4, as well as in FIGS. 5A, 5B and 5C which illustrate the system level gain achieved by coordinated code allocation. In this example the system level performance can be a 1.2 dB gain increase as compared to a non-coordinated case. This is true coverage gain for the ACK/NACK transmitted on PUCCH. Note that reuse between cells of different Node Bs is better than the reuse between cells of the same Node B. However, the reuse between cells of different Node Bs requires the use of a synchronized network.

As was discussed above, the basic problem relates to the signaling burden of the implicit ACK/NACK resource. The counterpart of the signaling burden is the signaling flexibility. An advantage of the previous technique (explicit signaling of implicit ACK/NACK resources) is the fact that it exhibits full flexibility in dividing the available cyclic shift resources between the available resources allocated for ACK/NACKs. One issue related to the reduced signaling burden is the fact that sufficient flexibility for resource allocation must be provided.

The exemplary embodiments of this invention provide an efficient signaling scheme for the implicit ACK/NACK resources. The exemplary embodiments of this invention provide a method, apparatus and functionality to allocate and signal the available implicit ACK/NACK resources using a limited number of cell-specific parameters. The exemplary embodiments of this invention are realized at least in part by an algorithm and functional block that utilizes these parameters as an input. Preferably, the procedure is standardized such that both the UE 10 and the eNodeB 12 may utilize it.

Figure 7:
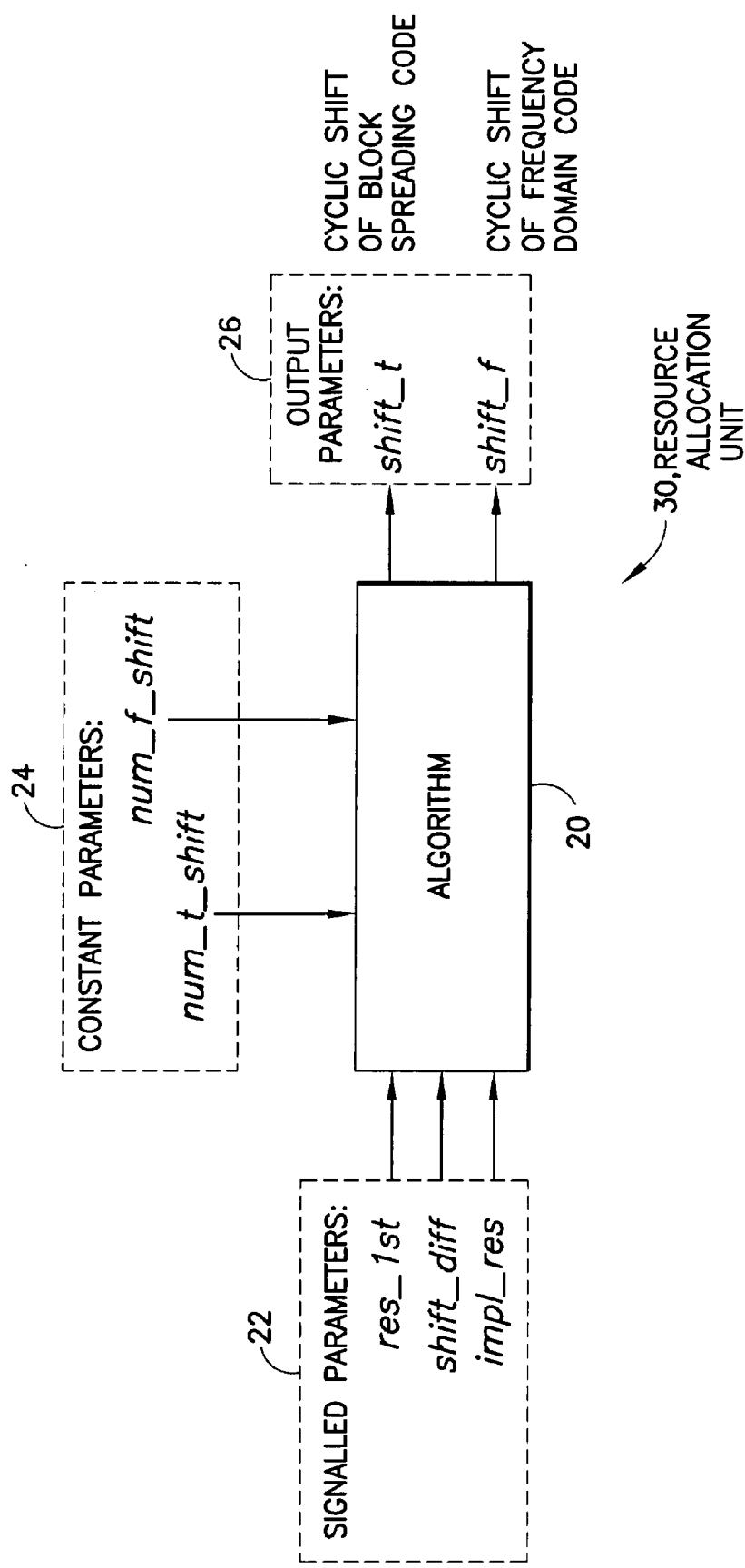
FIG. 7 is a block diagram of a resource allocation functional unit in accordance with exemplary embodiments of this invention.

The basic functionality of the resource allocation unit 30 is illustrated in FIG. 7, and includes an algorithm 20 (a functional block implemented in software, or hardware, or as a combination of software and hardware) that receives input parameters including signaled (semi-static) parameters 22 and constant (static) parameters 24, and that provides output parameters 26.

The (cell-specific) semi-static input parameters 22 comprise the following:

(a) res_1st: the resource number of the first implicit ACK/NACK resource. An example of an applied resource numbering is presented in FIG. 8.

(b) shift_diff: the cyclic shift difference between two implicit ACK/NACK resources. For example, when the desired allocation order is [0, 3, 6, 9, . . . ], then shift_diff=3. This parameter may also be used as a code reuse parameter when the same code resources are utilized in a coordinated way in adjacent cells.

It should be noted that the above two semi-static parameters may be explicitly signaled to the UE 10 either via higher layer signaling (e.g., RRC signaling) at the beginning of a connection, or they are explicitly broadcast to the entire cell, or they may be implicitly signaled, e.g., derived from other cell specific parameters.

The only dynamic parameter is (c) impl_res: resource number of the ACK/NACK resource, which is signaled via implicit signaling, [0, 1, 2, . . . ] (e.g., the index of the DL control channel).

The (cell specific) static input parameters 24 comprise the following:

(a) num_t_shift: number of cyclic shifts of the block spreading code (e.g., 4), which may be considered to be the block spreading factor; and (b) num_f_shift: number of cyclic shifts of the frequency domain (CAZAC) code, where for example num_f_shift=12 with one RU.

The output parameters 26 comprise the following:

(a) shift_t: the cyclic shift of the block spreading code (for the given impl_res); and (b) shift_f: the cyclic shift frequency domain CAZAC code (for the given impl_res).

It should be appreciated that all references to CAZAC codes in this detailed description and in the following claims are intended to encompass all forms of CAZAC codes, including also by example truncated and extended ZC sequences, as well as computer-search based sequences, without limitation.

The operation of the algorithm 20 to determine shift_t and shift_f may be illustrated in the following exemplary and non-limiting embodiments as follows:

shift_t = mod ( floor(i_temp / num_f_shift), num_t _shift) (1)
shift_f = mod ( i_temp + shift_t + mod ( floor( impl_res ×
shift_diff / num_res ), shift_diff), num_f_shift )  (2)
where
num_res = num_t_shift × num_f_shift    (3)
i_temp = res_1st + (impl_res × shift_diff).   (4)

In the foregoing the floor function rounds the elements of the nearest integers towards minus infinity, and mod is the modulus after the division operation.

Figure 9:
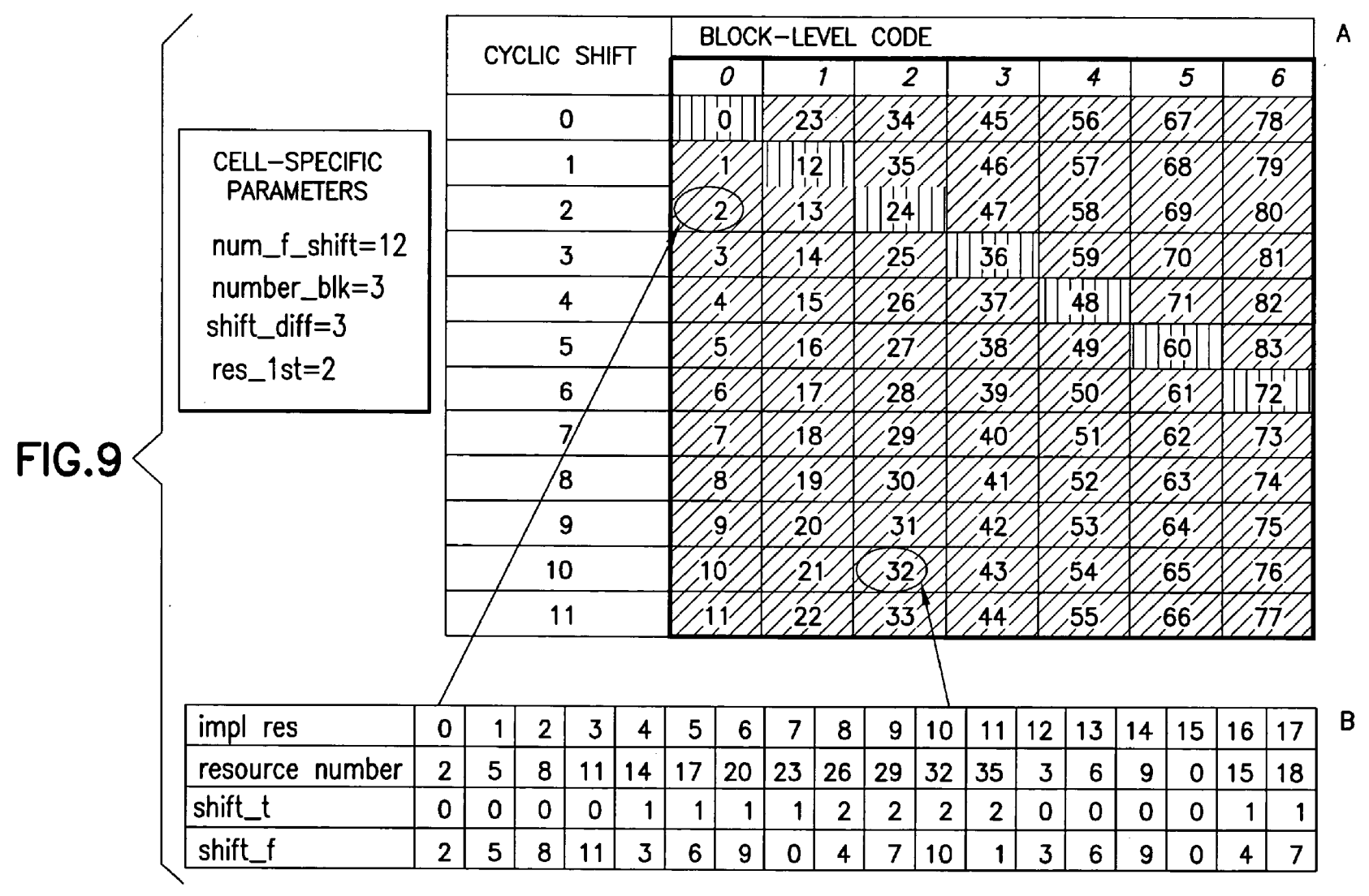
Figure 10A:
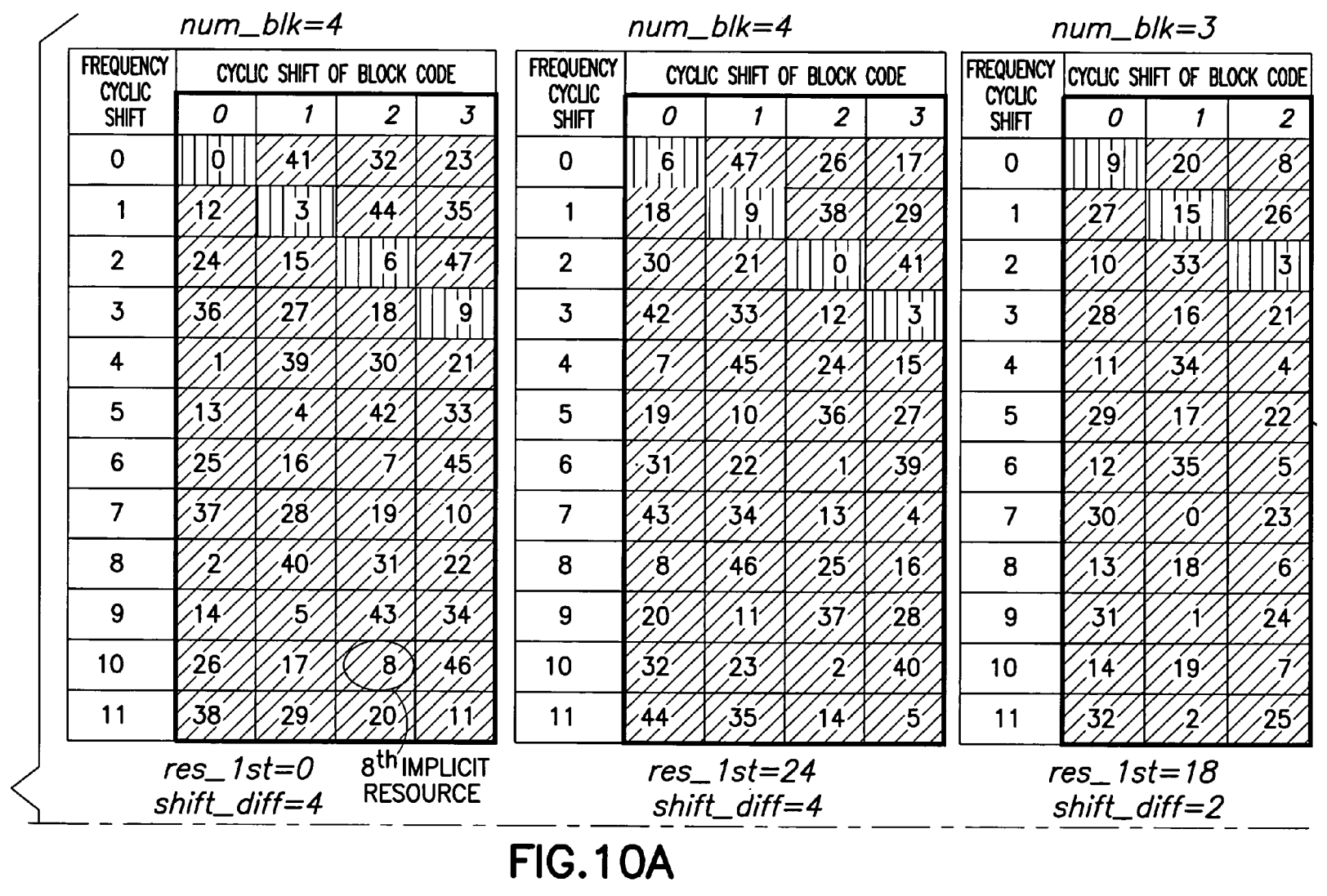
Figure 11:
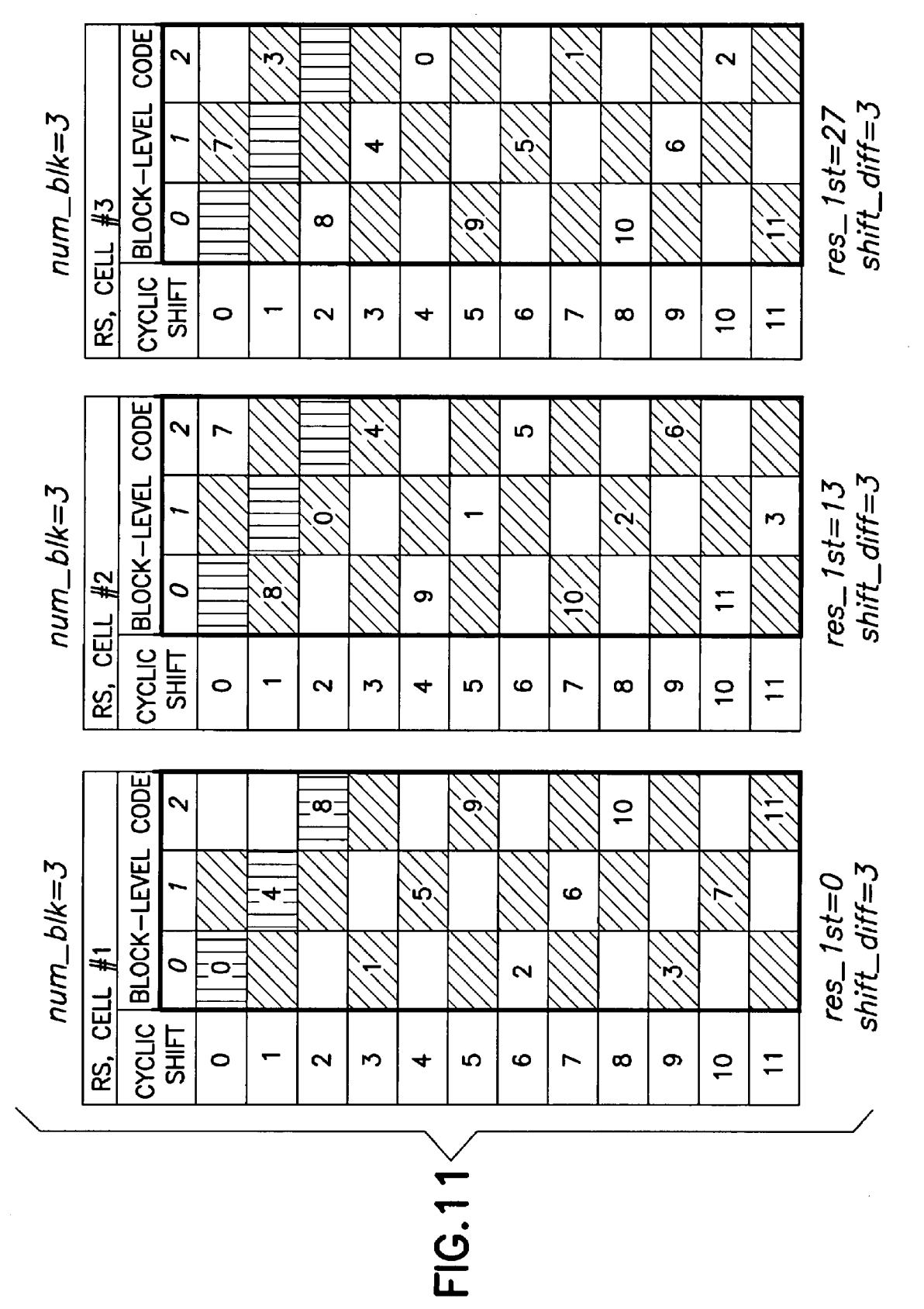

FIG. 9 is an example of resource allocation, where the block A shows a numbering principle and block B shows an example of a shift allocation for the indicated cell-specific parameters. FIGS. 10 and 11 present further examples of resource allocation using the resource allocation unit 30 of FIG. 7.

The foregoing procedure may be used with semi-persistent UEs 10 (those which have a DL allocation grant only for a re-transmission) in such a way that: (a) an implicit ACK/NACK resource is based on an applied DL resource (the signaling of these resources can be based on the foregoing exemplary embodiments); and (b) different resource pools are reserved and signaled for dynamically scheduled and semi-persistently allocated UEs 10.

Another alternative is to apply the foregoing procedure also for the semi-persistent UEs, and to signal the impl_res parameter explicitly with higher layer signaling.

In addition to the ACK/NACK application, the exemplary embodiments of this invention pertain as well to signaling of scheduling request (SR) resources. The scheduling request mechanism is intended to indicate that a certain UE 10 has a need for a data transmission in the UL. It has been agreed in the RAN1#47bis meeting in Sorrento that a non-contention based SR mechanism for time synchronized users should be supported. The multiplexing of SRs of multiple UEs 10 may can be based on a combination of block spreading and sequence modulation (the multiplexing technique is at present an open item in the standardization process). Signaling of these resources may be based on the procedures described herein with respect to the exemplary embodiments of this invention. In the case of SR, the signaling of the impl_res parameter may be done explicitly with higher layer signaling.

It is beneficial in some cases to allocate implicit resources only from the limited code space. For example, if the periodic CQI and ACK/NACK from different UEs 10 are transmitted in the same RU (e.g., narrowband bandwidth allocation), then some frequency domain cyclic shifts cannot be used as implicit ACK/NACK resources (e.g., cyclic shift #4 shown in FIG. 12).

In the case of an extreme Doppler spread (e.g., with a UE 10 speed of 360 km/h), it may be advantageous to allocate only those block level codes which are partially orthogonal to one another. In this case it may be useful to signal that some block level codes cannot be used as implicit resources (e.g., cyclic shifts #1 and #3 in FIG. 12).

The presence of the limited code space may be accommodated by signaling two additional semi-static parameters 22:
allowed_t_shift: a bit field containing allowed cyclic shifts of the block level code (num_t_shift bits); and
allowed_f_shift: a bit field containing allowed cyclic shifts of the frequency domain code (num_f shift bits).

Figure 13:
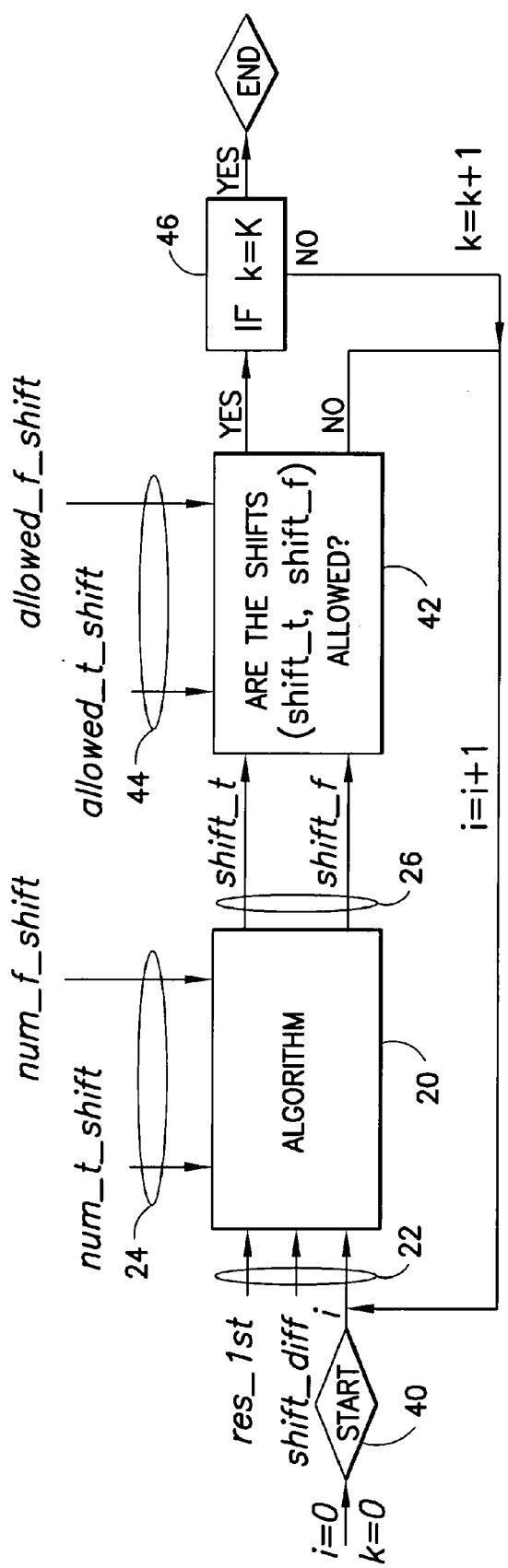
FIG. 13 is a logic flow/block diagram depicting, in accordance with exemplary embodiments of a method, a computer program product and/or an apparatus, the calculation of cyclic shifts (shift_t, shift_f) in the case of a limited code space.

FIG. 13 illustrates the operation of a method and a computer program product, as well as an apparatus, to calculate the cyclic shifts (shift_f, shift_t) in the case of the limited code space. In this embodiment the parameter i corresponds to the calculated resource (impl_res) and K is the actual implicit resource ([0, 1, 2, . . . ]).

At the start (block 40) i and k are initialized to zero. The semi-static and static parameters 22, 24 are then input to the algorithm functional block 20, which operates as described above to output shift_t and shift_f (output parameters 26). The output parameters 26 are applied to a determination block 42 that compares the output parameters 26 to parameters allowed_t_shift and allowed_f_shift 44. If the result is negative (shifts are not allowed) then i is incremented and control passes back to the algorithm functional block 20 to determine a next set of output parameters 26 using the next impl_res input parameter 22. If the output parameters 26 are allowed control passes to block 46 to determine if k=K (stopping value). If no, k is incremented and control passes back to the algorithm functional block 20. If k=K the procedure terminates.

The functionality depicted in FIG. 13 may be considered to form a part of the resource allocation unit 30 shown in FIGS. 6 and 7.

A number of advantages are realized by the use of the exemplary embodiments of this invention. For example, a reduced signaling burden is realized as it becomes possible to signal cyclic shifts of 36 implicit resources by using two parameters with 18 bits (existing ACK/NACK structure): a maximum of 6 bits to signal the res_1st parameter for the RS resource, a maximum of 6 bits to signal the res_1st parameter for data (ACK/NACK) resource, a maximum of 3 bits to signal the shift_diff parameter for the RS resource and a maximum of 3 bits to signal the shift_diff parameter for the data resource. The conventional approach discussed above would require 432 signaling bits for expressing the same information.

In addition, a maximum of 30 additional bits would be needed to signal the allowed cyclic shifts to support the limited code space case described above. For example, 12+3 bits are used for the RS resource (allowed_f_shift+allowed_t_shift), and 12+4 bits are used for the data resource (allowed_f_shift+allowed_t_shift). In practice, the allowed_f shift parameter can be the same for both RS and data blocks. In this case the additional signaling size due to the limited code space is equal to 19 bits.

The use of the exemplary embodiments of this invention also supports flexible resource allocation, since it provides an optimized code resource allocation against other cell interference (see FIG. 11) and facilitates reuse planning for the ACK/NACK transmitted on the PUCCH. The use of the exemplary embodiments of this invention also supports flexible resource allocation by providing optimized resource allocation against own cell interference (e.g., based on the number of UEs 10 and on the propagation conditions).

It should also be noted that the same signaling procedures discussed above are valid for code spaces of different sizes.

Figure 14:
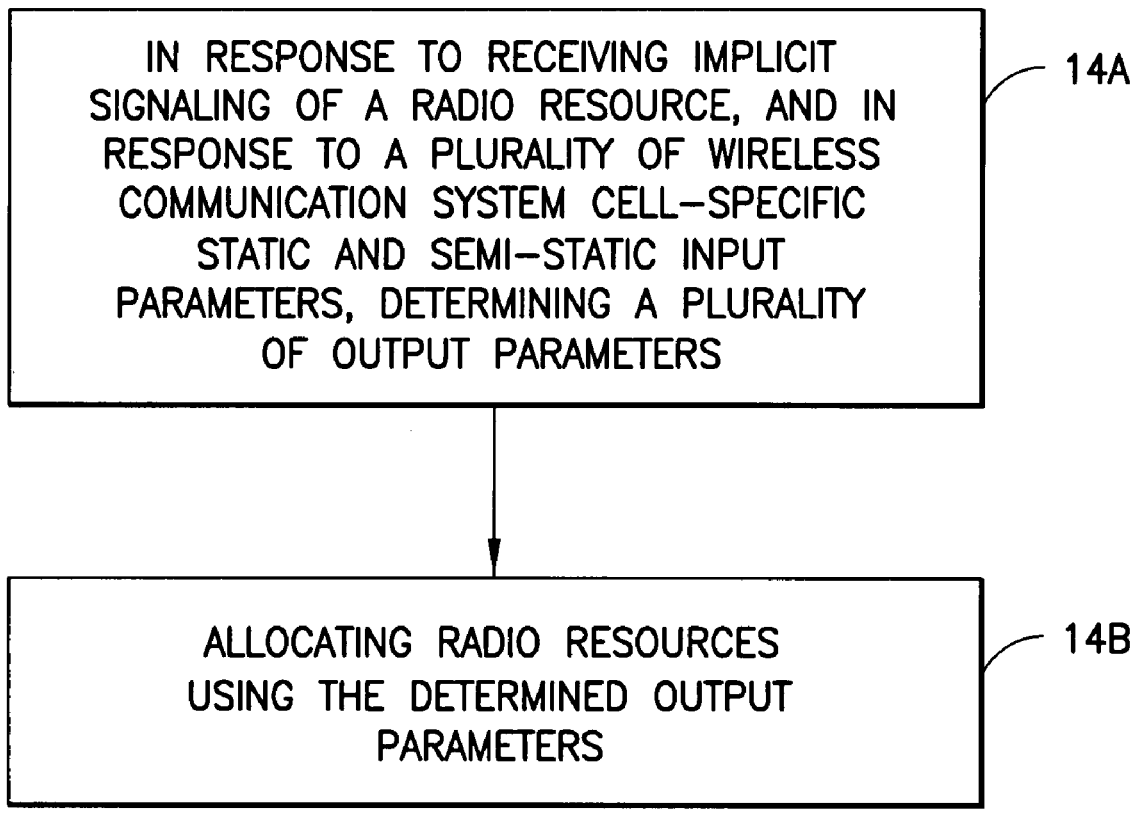
FIG. 14 is a logic flow diagram in accordance with exemplary embodiments of a method, and a computer program product, in accordance with this invention.

Based on the foregoing it should be apparent that the exemplary embodiments of this invention provide for, in a non-limiting aspect thereof, a method, apparatus and computer program product, as shown in FIG. 14, to operate (Block 14A) in response to receiving implicit signaling of a radio resource, and in response to a plurality of wireless communication system cell-specific static and semi-static input parameters, determining a plurality of output parameters; and (14B) allocating radio resources using the determined output parameters.

Further in accordance with exemplary embodiments of this invention the UE 10 of FIG. 6 is constructed to contain a receiver (R) configured to a receive implicit signaling of a radio resource, as well as a resource allocation unit (RAU 30) configured to respond to the received implicit signaling, and a plurality of wireless communication system cell-specific static and semi-static input parameters, to determine a plurality of output parameters to use in allocating uplink radio resources.

Further in accordance with exemplary embodiments of this invention the eNB 12 (base station) of FIG. 6 is constructed to contain a resource unit (RU) 12E configured to specify information for the UE 10, the information comprising a plurality of cell-specific static and semi-static input parameters, where the semi-static input parameters comprise res__1st: a resource number of a first implicit resource and shift_diff: a cyclic shift difference between two implicit resources; and the information further comprising a value for impl_res: a resource number. The eNB 12 further includes a transmitter (T) to transmit the information to the UE 10 for use in allocating resources to be used for sending at least one of ACK/NACK and SR signaling to the eNB 12.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Note further that the blocks shown in the logic flow diagram of FIG. 14 may also be viewed as a plurality of interconnected functional circuits/functions that operate as described.

As was noted above, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

As but one example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems. Further, the exemplary embodiments of this invention are not constrained for use with any specific frame format, numbers of long blocks within a frame, sub-carrier mapping scheme, and/or type of modulation, as non-limiting examples, that may have been referred to above. Still further, the various names used for the input and output parameters (e.g., res__1st, shift_diff, etc.) are not intended to be limiting in any respect, as these parameters may be identified by any suitable names.

It should be noted as well that the embodiments of this invention are not limited for use ACK/NACK and/or SRT resource allocation, and may be extended in at least some cases for use with the signaling of CQI information.

It should also be noted that in a still further embodiment a plurality of different parameters sets may be predefined using various ones of the parameters discussed above (e.g., res__1st, shift_diff and semi-static parameters). It then becomes possible to allocate to UEs 10 a pre-defined parameter set for a given cell by means of, for example, a broadcast channel. This embodiment clearly results in a reduction in the required amount of signaling bits and signaling overhead.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
in response to receiving implicit signaling of a radio resource, and in response to a plurality of wireless communication system cell-specific input parameters, determining a plurality of output parameters; and
allocating radio resources using the determined plurality of output parameters, where the plurality of wireless communication system cell-specific input parameters comprise semi-static input parameters comprising:
a resource number of a first implicit acknowledgement/negative acknowledgement resource; and
a cyclic shift difference between two implicit acknowledgement/negative acknowledgement resources, and
where the plurality of output parameters comprise a cyclic shift of a block spreading code and a cyclic shift of a frequency domain code associated with the resource number.

2. The method of claim 1, where the allocating comprises allocating physical uplink control channel radio resources; the method further comprising allocating the physical uplink control channel radio resources for the first implicit acknowledgement/negative acknowledgement resource using the cyclic shift of the block spreading code and the cyclic shift of the frequency domain code.

3. The method of claim 1, where the semi-static input parameters are received by implicit signaling.

4. The method of claim 1, where a further parameter comprises:
another resource number.

5. The method of claim 4, where the plurality of cell specific input parameters comprise static input parameters comprising:
a number of cyclic shifts of the block spreading code; and
a number of cyclic shifts of the frequency domain code.

6. The method of claim 5, where the plurality of output parameters comprise a cyclic shift of the block spreading code for a given value of the another resource number, and a cyclic shift of the frequency domain code for the given value of the another resource number.

7. The method of claim 6, where the cyclic shift of the block spreading code and the cyclic shift of the frequency domain code for the given value of the another resource number are determined by operations that comprise:

shift_t=mod ( floor(i_temp/num_f_shift), num_t_shift); and shift_f=mod ( i_temp+shift_t+mod (floor(impl_res×shift_diff/num_res), shift_diff), num_f_shift);

where num_res=num_t_shift×num_f_shift;

i_temp=res_1st+(impl_res×shift_diff); and where floor is a function that rounds elements of nearest integers towards minus infinity, and mod is the modulus after a division operation and where the another resource number is expressed as impl_res, the resource number of a first implicit resource is expressed as res_1$^{st}$, a cyclic shift difference between two implicit resources is expressed as shift_diff, a number of cyclic shifts of a block spreading code is expressed as num_t_shift, a number of cyclic shifts of a frequency domain code is expressed as num_f_shift, the cyclic shift of the block spreading code is expressed as shift_t for the given value of impl_res, and a cyclic shift of the frequency domain code is expressed as shift_f for the given value of impl_res.

8. The method of claim 6, where in a case of a limited code space the cyclic shift of the block spreading code and the cyclic shift of the frequency domain code for the given value of the another resource number are compared to allowed values of time and frequency shifts, respectively, and if the cyclic shifts are found to not be allowed, expressing the cyclic shift of the block spreading code and the cyclic shift of the frequency domain code with another given value of the another resource number.

9. The method as in claim 5, where the frequency domain code is comprised of a constant-amplitude zero auto-correlation code.

10. The method of claim 1, where the semi-static input parameters are received from a base station, and where the determining operation occurs in a user equipment.

11. The method of claim 1, where the allocated radio resources comprise acknowledgement/negative acknowledgement resources.

12. The method of claim 11, where the allocated acknowledgement/negative acknowledgement resources are orthogonally multiplexed within reference signal and data blocks with those of other user equipment using different cyclic shifts of a constant-amplitude zero auto-correlation code base sequence.

13. The method of claim 1, where the allocated radio resources comprise scheduling request resources.

14. A non-transitory computer readable medium encoded with a computer program the execution of which by a data processor results in operations that comprise:

in response to receiving implicit signaling of a radio resource, and in response to a plurality of wireless communication system cell-specific input parameters determining a plurality of output parameters; and allocating radio resources using the determined plurality of output parameters, where the plurality of wireless communication system cell-specific input parameters comprise semi-static input parameters comprising:

a resource number of a first implicit acknowledgement/negative acknowledgement resource; and a cyclic shift difference between two implicit acknowledgement/negative acknowledgement resources, and where the plurality of output parameters comprise a cyclic shift of a block spreading code and a cyclic shift of a frequency domain code associated with the resource number.

15. The non-transitory computer readable medium of claim 14, where the allocating comprises allocating physical uplink control channel radio resources; and further comprising allocating the physical uplink control channel radio resources for the first implicit acknowledgement/negative acknowledgement resource using the cyclic shift of the block spreading code and the cyclic shift of the frequency domain code.

16. The non-transitory computer readable medium of claim 14, where the semi-static input parameters are received by implicit signaling.

17. The non-transitory computer readable medium of claim 14, where a further input parameter comprises:

another resource number.

18. The non-transitory computer readable medium of claim 17, where the plurality of cell specific input parameters comprise static input parameters comprising:

a number of cyclic shifts of the block spreading code; and a number of cyclic shifts of the frequency domain code.

19. The non-transitory computer readable medium of claim 18, where the plurality of output parameters comprise a cyclic shift of the block spreading code for a given value of the another resource number, and a cyclic shift of the frequency domain code for the given value of the another resource number.

20. The non-transitory computer readable medium of claim 19, where the cyclic shift of the block spreading code and the cyclic shift of the frequency domain code for the given value of the another resource number are determined by operations that comprise:

shift_t=mod ( floor(i_temp/num_f_shift), num_t_shift); and shift_f=mod ( i_temp+shift_t+mod (floor(impl_res×shift_diff/num_res), shift_diff), num_f_shift);

where num_res=num_t_shift×num_f_shift;

i_temp=res_1st+(impl_res×shift_diff); and where floor is a function that rounds elements of nearest integers towards minus infinity, and mod is the modulus after a division operation and where the another resource number is expressed as impl_res, the resource number of a first implicit resource is expressed as res_1$^{st}$, a cyclic shift difference between two implicit resources is expressed as shift_diff, a number of cyclic shifts of a block spreading code is expressed as num_t_shift, a number of cyclic shifts of a frequency domain code is expressed as num_f_shift, the cyclic shift of the block spreading code is expressed as shift_t for the given value of impl_res, and a cyclic shift of the frequency domain code is expressed as shift_f for the given value of impl_res.

21. The non-transitory computer readable medium of claim 19, where in a case of a limited code space the cyclic shift of the block spreading code and the cyclic shift of the frequency domain code for the given value of the another resource number are compared to allowed values of time and frequency shifts, respectively, and if the cyclic shifts are found to not be allowed, expressing the cyclic shift of the block spreading code and the cyclic shift of the frequency domain code with another given value of the another resource number.

22. The non-transitory computer readable medium of claim 18, where the frequency domain code is comprised of a constant-amplitude zero auto-correlation code.

23. The non-transitory computer readable medium of claim 14, where the semi-static input parameters are signaled from a base station, and where the determining operation occurs in a user equipment.

24. The non-transitory computer readable medium of claim 14, where the allocated radio resources comprise acknowledgement/negative acknowledgement resources.

25. The non-transitory computer readable medium of claim 24, where the acknowledgement/negative acknowledgement resources are orthogonally multiplexed within reference signal and data blocks with those of other user equipment using different cyclic shifts of a constant-amplitude zero auto-correlation code base sequence.

26. The non-transitory computer readable medium of claim 14, where the allocated radio resources comprise scheduling request resources.

27. An apparatus comprising:
   at least one processor; and
   at least one memory including computer program instructions, where the at least one memory and the computer program instructions are configured, with the at least one processor, to cause the apparatus to at least:
   receive implicit signaling of a radio resource; and
   respond to the received implicit signaling, and a plurality of wireless communication system cell-specific input parameters, to determine a plurality of output parameters to use in allocating uplink radio resources, where the plurality of wireless communication system cell-specific input parameters comprise semi-static input parameters comprising:
   a resource number of a first implicit acknowledgement/negative acknowledgement resource; and
   a cyclic shift difference between two implicit acknowledgement/negative acknowledgement resources, and
   where the plurality of output parameters comprise a cyclic shift of a block spreading code and a cyclic shift of a frequency domain code associated with the resource number.

28. The apparatus of claim 27, where the allocating comprises allocating physical uplink control channel radio resources; the at least one memory including computer program instructions is configured, with the at least one processor, to cause the apparatus to allocate the physical uplink control channel radio resources for the first implicit acknowledgement/negative acknowledgement resource using the cyclic shift of the block spreading code and the cyclic shift of the frequency domain code.

29. The apparatus method of claim 27, where the semi-static input parameters are received by implicit signaling.

30. The apparatus of claim 27, where a further input parameter comprises:
   another resource number.

31. The apparatus of claim 30, where the plurality of cell specific input parameters comprise static input parameters comprising:
   a number of cyclic shifts of the block spreading code; and
   a number of cyclic shifts of the frequency domain code.

32. The apparatus of claim 31, where the plurality of output parameters comprise a cyclic shift of the block spreading code for a given value of the another resource number, and a cyclic shift of the frequency domain code for the given value of the another resource number.

33. The apparatus of claim 32, where the cyclic shift of the block spreading code and the cyclic shift of the frequency domain code for the given value of the another resource number are determined by the resource allocation unit by operations that comprise:
   shift_t=mod ( floor(i_temp/num_f_shift), num_t_shift); and
   shift_f=mod ( i_temp+shift_t+mod (floor(impl_res×shift_diff/num_res), shift_diff), num_f_shift);
   where
   num_res=num_t_shift×num_f_shift;
   i_temp=res_1st+(impl_res×shift_diff); and
   where floor is a function that rounds elements of nearest integers towards minus infinity, and mod is the modulus after a division operation and where the another resource number is expressed as impl_res, the resource number of a first implicit resource is expressed as res_$1^{st}$, a cyclic shift difference between two implicit resources is expressed as shift_diff, a number of cyclic shifts of a block spreading code is expressed as num_t_shift, a number of cyclic shifts of a frequency domain code is expressed as num_f_shift, the cyclic shift of the block spreading code is expressed as shift_t for the given value of impl_res, and a cyclic shift of the frequency domain code is expressed as shift_f for the given value of impl_res.

34. The apparatus of claim 32, where in a case of a limited code space the cyclic shift of the block spreading code and the cyclic shift of the frequency domain code for the given value of the another resource number are compared to allowed values of time and frequency shifts, respectively, and if the cyclic shifts are found to not be allowed, expressing the cyclic shift of the block spreading code and the cyclic shift of the frequency domain code with another given value of the another resource number.

35. The apparatus as in claim 31, where the frequency domain code is comprised of a constant-amplitude zero auto-correlation code.

36. The apparatus of claim 27, where the semi-static input parameters are received from a base station, and where the resource allocation unit is embodied in a user equipment.

37. The apparatus of claim 27, where the allocated radio resources comprise acknowledgement/negative acknowledgement resources.

38. The apparatus of claim 37, where the acknowledgement/negative acknowledgement resources are orthogonally multiplexed within reference signal and data blocks with those of other user equipment using different cyclic shifts of a constant-amplitude zero auto-correlation code base sequence.

39. The apparatus of claim 27, where the allocated radio resources comprise scheduling request resources.

40. An apparatus comprising:
   means for receiving implicit signaling of a radio resource; and
   means for determining a plurality of output parameters to use in allocating uplink radio resources, said determining means using the received implicit signaling and a plurality of wireless communication system cell-specific input parameters, where the plurality of wireless communication system cell-specific input parameters comprise semi-static input parameters comprising:
   a resource number of a first implicit acknowledgement/negative acknowledgement resource; and
   a cyclic shift difference between two implicit acknowledgement/negative acknowledgement resources, and where the plurality of output parameters comprise a cyclic shift of a block spreading code and a cyclic shift of a frequency domain code associated with the resource number.

41. A user equipment comprising:
a receiver configured to receive implicit signaling of a radio resource; and
a resource allocation unit configured to respond to the received implicit signaling, and a plurality of wireless communication system cell-specific input parameters, to determine a plurality of output parameters to use in allocating uplink radio resources, where
the plurality of output parameters comprise a cyclic shift of a block spreading code and a cyclic shift of a frequency domain code;
the plurality of wireless communication system cell-specific input parameters are received by implicit signaling; where
the plurality of wireless communication system cell-specific input parameters comprise semi static input parameters comprising:
res_1st: a resource number of a first implicit resource; and
shift_diff: a cyclic shift difference between two implicit resources; where
a further wireless communication system input parameter comprises impl_res: a resource number; and where
the plurality of cell specific input parameters comprise
num_t_shift: a number of cyclic shifts of a block spreading code; and
num_f_shift: a number of cyclic shifts of a frequency domain code; where
the output parameters comprise a cyclic shift of the block spreading code, expressed as
shift_t, for a given value of impl_res, and a cyclic shift of the frequency domain code, expressed as shift_f, for the given value of impl_res; and where
shift_t and shift_f are determined by the resource allocation unit by operations that comprise:
shift_t=mod ( floor(i_temp/num_f_shift), num_t_shift); and
shift_f=mod ( i_temp+shift_t+mod (floor(impl_res×shift_diff/num_res), shift_diff), num_f_shift);
where
num_res=num_t_shift×num_f_shift;
i_temp=res_1st+(impl_res×shift_diff); and
where floor is a function that rounds elements of nearest integers towards minus infinity, and mod is the modulus after a division operation.

42. The user equipment of claim 41, further comprising in a case of a limited code space comparing shift_t and shift_f to allowed values of time and frequency shifts, respectively, and if shift_t and shift_f are found to not be allowed, iterating the operations with another given value of impl_res.

43. The user equipment of claim 41, where the frequency domain code is comprised of a constant-amplitude zero auto-correlation code.

44. The user equipment of claim 41, where the allocated radio resources comprise acknowledgement/negative acknowledgement resources that are orthogonally multiplexed within reference signal and data blocks with those of other user equipment using different cyclic shifts of a constant-amplitude zero auto-correlation code base sequence.

45. The user equipment of claim 41, where the allocated radio resources comprise scheduling request resources.

46. A wireless network device, comprising:
a resource unit configured to specify information for a user equipment, the information comprising a plurality of cell-specific input parameters, said input parameters comprising semi static input parameters comprising:
res_1st: a resource number of a first implicit acknowledgement/negative acknowledgement resource;
shift_diff: a cyclic shift difference between two implicit acknowledgement/negative acknowledgement resources, and
where the plurality of output parameters comprise a cyclic shift of a block spreading code and a cyclic shift of a frequency domain code associated with the resource number;
the information further comprising a value for impl_res: a resource number; and
a transmitter to transmit the information to the user equipment for use in allocating resources to be used for sending at least one of acknowledgement/negative acknowledgement and scheduling request signaling to the wireless network device.

47. The wireless network device of claim 46, where the plurality of cell-specific input parameters signal cyclic shifts of 36 implicit resources using a maximum of 6 bits to signal the res_1st parameter for a reference signal resource, a maximum of 6 bits to signal the res_1st parameter for a data resource, a maximum of 3 bits to signal the shift_diff parameter for the reference signal resource and a maximum of 3 bits to signal the shift_diff parameter for the data resource.

48. The wireless network device of claim 46, where allowed_f_shift and allowed_t_shift parameters are signaled for a case of a constrained code space for indicating allowable values of a cyclic shift of a block spreading code shift_t, for a given value of impl_res, and allowable values of a cyclic shift of a frequency domain code shift_f, for the given value of impl_res.

49. The wireless network device of claim 46, where the wireless network comprises an evolved universal mobile telecommunications system terrestrial radio access network, and where the at least one of acknowledgement/negative acknowledgement and scheduling request signaling is received on a physical uplink control channel.

* * * * *